J. WERNER.
T. WERNER, REPRESENTATIVE IN TRUST.
CANDY FORMING MACHINE.
APPLICATION FILED AUG. 27, 1914.
1,206,069. Patented Nov. 28, 1916.
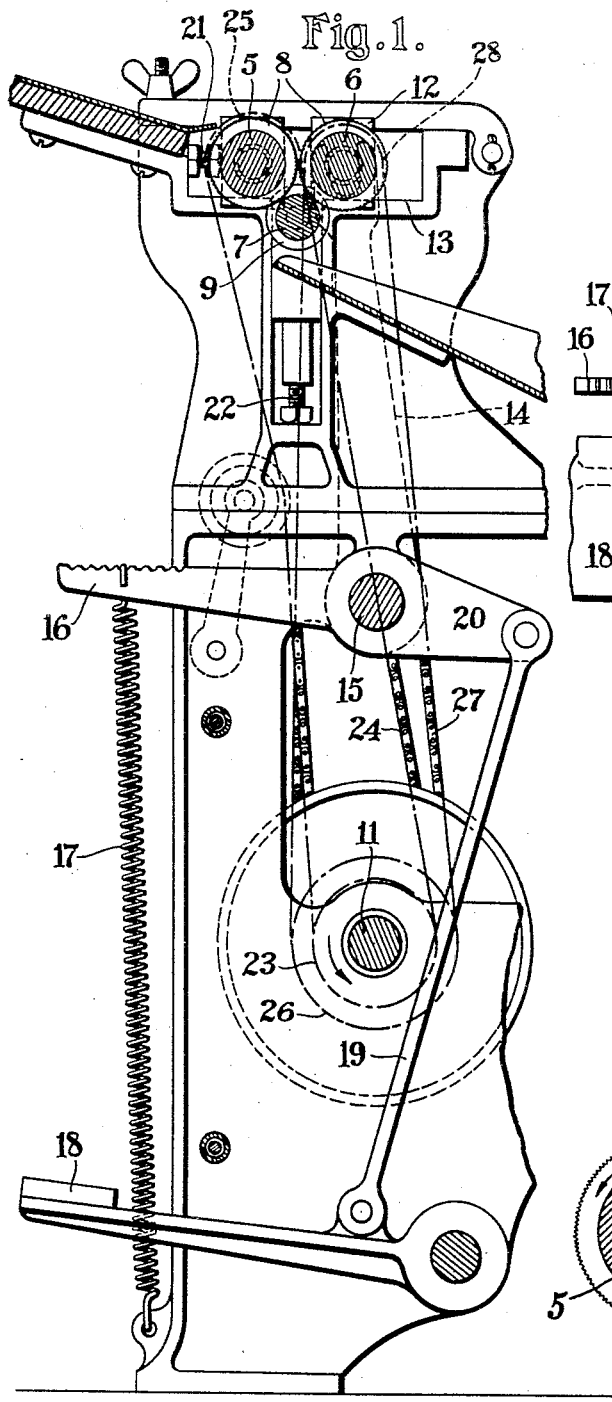
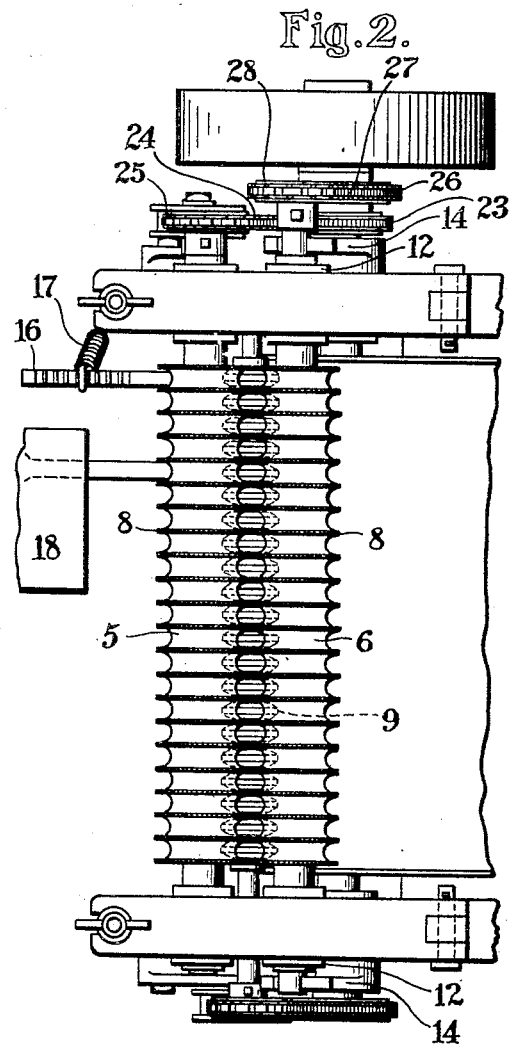
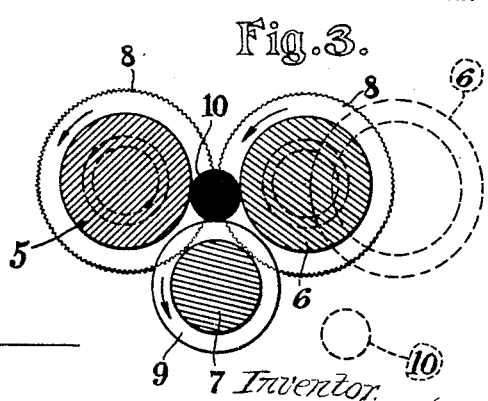
Witnesses:
Clarence W. Carroll
D. Gurnee
Inventor.
John Werner (Insane)
Theodore Werner,
Representative in Trust,
by his attorneys
Davis & Dorsey

UNITED STATES PATENT OFFICE.

JOHN WERNER, OF ROCHESTER, NEW YORK, BY THEODORE WERNER, REPRESENTATIVE IN TRUST, OF ROCHESTER, NEW YORK.

CANDY-FORMING MACHINE.

1,206,069.  Specification of Letters Patent.  Patented Nov. 28, 1916.

Application filed August 27, 1914. Serial No. 858,974.

*To all whom it may concern:*

Be it known that I, THEODORE WERNER, a citizen of the United States, and resident of Rochester, in the county of Monroe and State of New York, and representative in trust of the estate of JOHN WERNER, an insane person, hereby declare that said JOHN WERNER has invented certain new and useful Improvements in Candy-Forming Machines, of which the following is a specification.

This invention relates to machines of the type in which a body of candy composition, or similar plastic material, is cut and formed into pieces of spherical form, or other form circular in cross-section, by the action of two or more rollers having suitably formed surfaces between which the body of material is simultaneously rolled and cut, the adjacent portions of the working faces of these forming-rollers being rotated in opposite directions so that the candy, instead of being merely carried through the space between the rollers, is maintained in this space throughout the forming operation.

Machines of the type in question are commonly designated as "fancy hard-candy machines", and, as commonly constructed, they comprise two forming-rollers having annular concavities and intermediate cutting-edges, and a supporting-roller having annular portions which project into the concavities in the forming-rollers, the three rollers being so arranged as to produce a space between their adjacent peripheral portions in which the candy is rolled and formed, and the forming-rollers being rotated with equal peripheral velocities in the same direction, so that the operative parts of their peripheries move in opposite directions with respect to the supporting-roller and thus tend to produce a rotary movement in the candy during the cutting and forming operation. In machines of this type it is necessary to separate the rollers to receive the roughly cylindrical body of candy which is to be formed into pieces, and the rollers are then gradually moved toward each other so as to subject the candy to the pressure by which it is cut and rolled into the finished pieces, the material being thus gradually squeezed into the spaces defined by the annular concavities in the forming-rollers, while the supporting-roller merely maintains the candy in forcible engagement with the forming-rollers but is necessarily of such a form that it cannot contribute substantially to the actual shaping of the pieces. In such previously constructed machines of this type it has been found that, owing to the tendency of the candy to be pressed into forms other than round, in consequence of the salient form of the operative portions of the rollers, and to the tendency of the candy to stick against the surfaces of the rollers, difficulty is experienced in preventing the candy from being expelled from the space between the rollers during the forming operation. For this reason it has usually been necessary for the operator of such a machine to hold the candy in place by the use of the hand, or a stick, or other means, and it has also been necessary to control manually the movement of the rollers toward each other, so as to accommodate the pressure of the rollers to the varying characteristics of the material. To counteract the tendency of the candy to escape from between the rollers it has also been common to so support and move the three rollers that they move simultaneously, in different directions, toward their final position, the forming-rollers usually moving horizontally toward each other, while the supporting-roller moves vertically in a position beneath and between the forming-rollers, the intention being to thus more closely confine the candy by restricting, at all times during the forming operation, the space, between the two forming-rollers, through which the candy may escape. This last arrangement, however, tends to defeat its own object for the reason that during the forming operation the candy is not maintained in a position near the plane of the axes of the forming-rollers, wherein it will be subjected to pressure chiefly from these rollers and only to a minimum degree from the supporting-roller, but, on the contrary, the working pressure is largely due to the movement of the supporting-roller, which therefore tends to expel the candy through the space between the forming-rollers. Furthermore, it will be apparent that where the rollers are moved together by force applied manually, careless operation of the means for this purpose may cause the machine to operate improperly. For all of the foregoing reasons the previous machines constructed as just described are comparatively slow in operation and require skilled operators, and the necessity of manipulating the material during the operation of the forming-rollers makes their use laborious.

Another disadvantage of the machines just described resides in the fact that when the three rollers are all moved apart for the reception of new material the formed pieces of candy are not automatically discharged from the forming-rollers, owing to the fact that no two of the rollers remain in coöperative position at this time, and accordingly it is frequently necessary for the operator to remove the pieces of candy from the forming-rollers, an operation which is attended with both difficulty and danger.

It is the object of the present invention to produce a candy-forming machine which will obviate the disadvantages above set forth and operate in a more nearly automatic manner, so as to dispense with any manipulation of the material during either the forming or the discharging operation. To this end the rollers of this improved machine are, in the first place, so arranged that during the forming operation the body of the candy is maintained by the supporting-roller with its axis nearly in the plane of the axes of the forming-rollers, so that the pressure to which the material is subjected is imparted almost entirely by the forming-rollers, and is thus most effective in cutting and forming the candy while having the least tendency to cause its expulsion. In order that the candy may be maintained in such position without danger of its being carried out of place by the action of that forming-roller of which the operative portion of the periphery moves away from the supporting-roller, the means by which the forming-rollers are rotated are so constructed and arranged that the second forming-roller is driven with a higher peripheral velocity than the first. Accordingly, this second forming-roller tends to force the candy more strongly toward the supporting-roller than the first forming-roller tends to move it away therefrom, with the result that the candy is at all times forced toward the supporting-roller as the result of any tendency it may have to cling to the forming-rollers. In the second place, it has been found that by serrating the annular salient portions or cutting-edges of the forming-rollers the hold of these portions upon the candy is so increased as to positively insure that they shall impart rotative movement to the candy, thus promoting their rolling action thereon, in place of a dragging or rubbing action, and diminishing the tendency of the candy to cling to the rollers. In the third place, the movement of the rollers toward one another, by which the candy is subjected to the forming pressure, is produced automatically in this machine by the use of a spring or other means adapted to produce a predetermined regulated pressure. This pressure may be adjusted according to the consistency and bulk of the material, or the shape which is to be imparted to it, so that the pressure is uniformly adapted to the requirements of the operation and does not depend upon the skill of the operator.

The foregoing improvements have relation particularly to the certainty of the forming operation. In order that the discharging operation may also be performed automatically and with certainty, the rollers are so supported that during the opening movement of the machine, that is to say, the movement by which space is afforded for the introduction of a fresh supply of material, the supporting-roller is maintained in close coöperative relation with that one of the forming-rollers of which the operative portion of the periphery moves away from the supporting-roller. As a consequence of this arrangement the formed pieces of candy are given a rolling movement by which they are effectively discharged at the completion of the forming operation, when space for this purpose is afforded by moving the other forming-roller away.

In the accompanying drawings:—Figure 1 is a partial vertical section of a candy-forming machine embodying the present invention, showing particularly the rollers and the means for supporting and actuating them; Fig. 2 is a plan-view of the same parts; and Fig. 3 is a vertical sectional view, on a larger scale than the other figures, showing the rollers together with the material upon which they are operating.

In the illustrated embodiment of the invention the forming-rollers 5 and 6 are of the usual shape such as is employed in the production of spherical pieces of candy, these rollers having annular concavities, semi-circular in section, and intermediate salient portions or edges 8. The supporting-roller 7 has a series of annular salient portions 9 which project into the concavities in the forming-rollers, with intermediate grooves which afford clearance for the cutting-edges 8.

The forming-rollers are journaled on horizontal axes located always in the same horizontal plane, and these rollers and the supporting-roller form between them a space in which an elongated roll 10 of plastic candy material may be received, as shown in Fig. 3, and as the rollers are rotated and gradually draw together toward the position shown in Fig. 3 the candy is rotated and the edges 8 are gradually forced into it, the material being thus squeezed into the concavities in the forming-rollers and at the same time rolled into separate spherical pieces.

The forming-rollers are journaled in bearing-members mounted in horizontal seats 13 in the frame of the machine, and the bearing-members of the roller 5 are normally fixed therein, although they may be adjusted horizontally by means of adjusting-screws 21. The bearing-members 12 of the roller 6, on the other hand, are moved horizontally in the seats 13 by manually-operable means. For this purpose the journals of the roller 6 are embraced by the forked upper ends of lever-arms 14 fixed upon a rock-shaft 15, and this shaft is provided with an arm 16 to which a tension-spring 17 is connected. This spring tends to rock the arms and the rock-shaft in such a direction as to cause the roller 6 to be moved horizontally toward the roller 5, and the pressure to which the candy is subjected in this manner may be adjusted by changing the point of attachment of the spring 17 to the arm 16 in a manner apparent from Fig. 1. To cause the opposite movement of the roller 6 the rock-shaft 15 is connected, by an arm 20 and a link 19, with a treadle 18. By depressing the treadle 18 the operator causes the arms and the shaft to move the roller 6 away from the roller 5.

The forming-rollers are rotated by connections with a power-shaft 11 which may be connected with any suitable source of power. This shaft carries a sprocket-wheel 23 which is connected, by a chain 24, with a sprocket-wheel 25 on one journal of the roller 5, and this roller is thus caused to rotate in the direction indicated by an arrow in Fig. 3. A second sprocket-wheel 26 on the shaft 11 is connected, by a chain 27, with a sprocket-wheel 28 on one journal of the roller 6, and the roller 6 is thus rotated in the same direction as the roller 5. Owing, however, to the different sizes of the sprocket-wheels, as indicated in Fig. 1, the roller 6 is rotated with a higher peripheral velocity than the roller 5, and the roller 6, it is to be noted, is that of which the operative portion of the periphery moves toward the supporting-roller 7. The supporting-roller may be rotated by its engagement with the rotating body of material, and accordingly no mechanism for this purpose is illustrated or is necessary.

The supporting-roller is journaled in a normally fixed axial position, although provision for vertical adjustment is provided by means including adjusting-screws 22, as shown in Fig. 1, to accommodate the position of the supporting-roller to the various shapes and sizes of the forming-rollers which may be employed. During the operation of the machine, however, the axial position of the supporting-roller is fixed with respect to that of the forming-roller 5.

As shown in the drawings, the cutting-edges 8 of the forming-rollers are serrated or knurled for the purpose of increasing their hold upon the material and their tendency to cause rotation of the latter.

The machine is operated as follows: With the power-shaft in motion and the forming-rollers rotating in the same direction, but at different speeds, the operator depresses the treadle 18, thus moving the roller 6 away from the roller 5 into the position shown in dotted lines in Fig. 3. The operator then drops an approximately cylindrical body or roll of plastic candy material into the space between the forming-rollers and upon the surface of the supporting-roller, and then releases the treadle 18. The spring 17 thereupon causes the roller 6 to move at once into engagement with the material, and to subject the material to the predetermined pressure, and in consequence of this pressure and of the rotation of the forming-rollers the material is quickly cut and rolled into a series of spherical pieces. As soon as the roller 6 has returned to its original position upon the completion of the forming operation the operator again depresses the treadle. The roller 6 thus moves out of engagement with the candy, while the rollers 5 and 7 continue to rotate the pieces of candy. But since the supporting-roller is not positively driven it tends to come quickly to rest, and thereafter the rotative movement of the pieces of candy, assisted by the continued rotation of the roller 5, causes these pieces to roll to the right over the surface of the supporting-roller 6 and to be discharged almost immediately, as indicated in dotted lines in Fig. 3. The operator then introduces fresh material, and the forming operation may be repeated.

This invention is not limited to the embodiment thereof hereinbefore described and illustrated in the accompanying drawings, but it may be embodied in various other forms within the nature of the invention as it is defined in the following claims.

Claims:—

1. A candy-forming machine provided with a supporting-roller and two forming-rollers between which a body of candy is cut and rolled, and with means for rotating the forming-rollers both in the same direction; the machine being characterized by the fact that said means are constructed and adapted to rotate that forming-roller of which the operative portion of the periphery moves toward the supporting-roller at a higher peripheral velocity than that of the other forming-roller.

2. In a candy-forming machine provided with a supporting-roller and two forming-rollers between which a body of candy is cut and rolled, and with means for rotating the forming-rollers both in the same direction;

means for moving one forming-roller away from and toward the other forming-roller to permit the introduction of, and the application of pressure to, a body of candy, and means for rotatably supporting the supporting-roller in substantially fixed relation to that one of the forming-rollers of which the operative portion of the periphery moves away from the supporting-roller, so that the supporting-roller may coöperate with said forming-roller in discharging the formed candy when the other forming-roller is moved away.

3. A candy-forming machine provided with a supporting-roller and two forming-rollers between which a body of candy is cut and rolled, and with means for rotating the forming-rollers both in the same direction; the machine being characterized by the fact that said means are constructed and adapted to rotate that forming-roller of which the operative portion of the periphery moves toward the supporting-roller at a higher peripheral velocity than that of the other forming-roller, and that the supporting-roller is rotatably supported at a substantially fixed distance from the plane of the axes of the forming-rollers during the forming operation.

4. A candy-forming machine provided with a supporting-roller and two forming-rollers between which a body of candy is cut and rolled, means for rotating the forming-rollers both in the same direction, means for moving at least one of the forming-rollers away from and toward the other forming-roller to permit the introduction of, and the application of pressure to, a body of candy between the forming-rollers; and spring means operating automatically to return the one forming-roller toward the other so as to subject the candy to a predetermined pressure during the forming operation.

5. A candy-forming machine provided with a supporting-roller and two forming-rollers between which a body of candy is cut and rolled, means for rotating the forming-rollers both in the same direction, means for moving at least one of the forming-rollers away from and toward the other forming-roller to permit the introduction of, and the application of pressure to, a body of candy between the forming-rollers; and spring means acting automatically to return the one forming-roller toward the other with a predetermined force so as to subject the candy to a predetermined pressure during the forming operation.

6. A candy-forming machine provided with a supporting-roller and two forming-rollers between which a body of candy is cut and rolled, means for rotating the forming-rollers both in the same direction, and means for moving at least one of the forming-rollers away from and toward the other forming-roller to permit the introduction of, and the application of pressure to, a body of candy between the forming-rollers; the machine being characterized by the fact that the last-mentioned means are manually-operable in a direction to separate the forming-rollers, but operate automatically with a predetermined force when moving in the opposite direction.

7. A candy-forming machine provided with a plurality of forming-rollers between which a body of candy is cut and rolled, and with means for rotating the forming-rollers in the same direction; the machine being characterized by the fact that the salient cutting-portions of at least one of the forming-rollers are serrated to insure a rotative movement of the candy during the forming operation.

THEODORE WERNER.

Witnesses:
FARNUM F. DORSEY,
D. GURNEE.